(12) United States Patent
Scrudders et al.

(10) Patent No.: US 11,891,968 B2
(45) Date of Patent: Feb. 6, 2024

(54) METHOD AND APPARATUS FOR OPERATING A DUAL VALVE TANK

(71) Applicant: Flex Technologies, Inc., Midvale, OH (US)

(72) Inventors: Darryl R. Scrudders, Kimbolton, OH (US); Brandon Nisewonger, Canton, OH (US)

(73) Assignee: FLEX TECHNOLOGIES, INC., Midvale, OH (US)

( * ) Notice: Subject to any disclaimer, the term of this patent is extended or adjusted under 35 U.S.C. 154(b) by 0 days.

(21) Appl. No.: 17/733,164

(22) Filed: Apr. 29, 2022

(65) Prior Publication Data

US 2023/0349348 A1 Nov. 2, 2023

(51) Int. Cl.
*F02M 37/00* (2006.01)
*B60K 15/03* (2006.01)

(52) U.S. Cl.
CPC ........ *F02M 37/0023* (2013.01); *B60K 15/03* (2013.01); *F02M 37/0088* (2013.01); *B60K 2015/03144* (2013.01); *B60K 2015/03263* (2013.01)

(58) Field of Classification Search
CPC .............. F02M 37/00; F02M 37/0023; F02M 37/0088; B60K 15/03

USPC .............. 137/625.16, 625.29, 625.3, 625.32, 137/625.47, 864; 251/310
See application file for complete search history.

(56) References Cited

U.S. PATENT DOCUMENTS

| | | | | |
|---|---|---|---|---|
| 4,951,711 A | * | 8/1990 | Kunz | F16K 27/067 251/290 |
| 5,893,393 A | * | 4/1999 | Erdkamp | F16K 11/0876 137/887 |
| 6,675,834 B1 | * | 1/2004 | Lai | F16K 11/0873 137/864 |
| 6,932,104 B2 | * | 8/2005 | Anderson | F16K 27/067 137/271 |
| 2007/0062590 A1 | * | 3/2007 | Nelson | F16K 5/06 137/625.47 |
| 2009/0235999 A1 | * | 9/2009 | Engelbrecht | F16K 31/041 137/625.46 |
| 2012/0199776 A1 | * | 8/2012 | Kreuter | F16K 31/045 29/525.01 |
| 2021/0001364 A1 | * | 1/2021 | Zhang | B05B 12/14 |
| 2023/0127434 A1 | * | 4/2023 | Bachman | B05B 15/534 137/15.06 |

* cited by examiner

*Primary Examiner* — John Kwon
*Assistant Examiner* — Johnny H Hoang
(74) *Attorney, Agent, or Firm* — Sand, Sebolt & Wernow Co., LPA

(57) ABSTRACT

An improved ball valve for use between dual fuel tanks having a non-circular outlet aperture leading to the fuel line and engine that can allow fuel to pass therethrough even when the ball contained within the valve rests in the opening of the outlet aperture.

20 Claims, 11 Drawing Sheets

METHOD AND APPARATUS FOR OPERATING A DUAL VALVE TANK

TECHNICAL FIELD

The present disclosure relates generally to the field of fuel valves operating between dual fuel tanks. More particularly, in one example, the present disclosure relates to a fluid ball valve operating between fuel tanks for vehicles having dual fuel tanks. Specifically, in another example, the present disclosure relates to a fluid ball valve operating between dual fuel tanks on a vehicle intended for off-road applications, such as large residential and/or commercial zero-turn lawn mowers and/or tractors utilizing multiple fuel tanks.

BACKGROUND

Certain personal and/or commercial maintenance vehicles, particularly large zero-turn lawn mowers and tractors, commonly utilize dual fuel tanks to both maximize the operating time of the vehicle as well as to help balance the vehicle through an even distribution of the fuel load.

Typically, such vehicles are utilized for maintaining large areas for activities such as mowing, seeding, or other lawn maintenance, and/or for other light agricultural-type applications. As such, these vehicles are typically operated off-road or on other uneven surfaces and commonly have to traverse up, down, and/or across the face of a slope, further causing the vehicle to tilt to the side, forward, or backwards.

Utilizing dual fuel tanks in these vehicles helps facilitate the delivery of fuel to the engine, even when the vehicle is operated on an angled surface or across a slope. Typically, this is accomplished by combining the fuel feeds from the dual tanks into a single fuel line utilizing a ball valve that allows a stainless steel ball to roll side to side freely therein. This ball may roll to one side or the other to effectively cut off the fuel supply from the tank on the side to which the ball has rolled, while allowing the fuel from the opposite tank to still travel to the engine. This is particularly beneficial when the vehicle is operated on a slope as the fuel level may fall below the valve inlet and the ball valve may prevent excess air entering the fuel line and affecting the fuel to air ratio needed for proper operation of the vehicle engine. Further, this may prevent unwanted transfer of fuel between the tanks to help maintain an even fuel load distribution.

In typical operation, the fuel valve is oriented such that the internal ball would not obstruct the fuel line leading away from the valve and to the engine. However, when the vehicle is operated at a certain angle, such as tilted forwardly down a slope, this may change the orientation of the valve and allow the ball contained therein to settle in the opening of the fuel line leading to the engine. For very brief instances where the valve is oriented in this position, there is typically no effect on the operation of the vehicle; however, if the vehicle remains at such an angle for an extended period of time, the orientation of the valve may then allow the ball to rest in the output opening of the valve. This may cause the ball to effectively cut off the flow of fuel from the fuel tanks to the engine, thereby causing the engine to stall and effecting the performance and ability to operate the vehicle.

Further, if the vehicle stalls while on an angled surface, it may be difficult or impossible to restart the vehicle as the fuel line may remain blocked by the ball until the valve is reoriented to move the ball away from the output line. Therefore, manual manipulation of the vehicle without power may be required, which may prove difficult and/or dangerous as it would require the operator of the vehicle to physically move the vehicle off of the angled surface to reposition the vehicle to dislodge the ball from the output line.

SUMMARY

The present disclosure addresses these and other issues by providing an improved ball valve for use between dual fuel tanks having a non-circular outlet aperture leading to the fuel line and engine that can allow fuel to pass therethrough even when the ball contained within the valve rests in the opening of the outlet aperture.

In one aspect, an exemplary embodiment of the present disclosure may provide a valve comprising: a first inlet in operable connection with a first fluid tank; a second inlet in operable connection with a second fluid tank; an outlet having an elliptical aperture defined therein, the aperture having a width and a height, wherein the width of the aperture is greater than the height of the aperture; and a ball operable to engage the first inlet, the second inlet, and the outlet aperture; wherein when the ball is engaged with the first inlet, fluid is blocked from entering the valve through the first inlet, when the ball is engaged with the second inlet, fluid is blocked from entering the valve through the second inlet, and wherein when the ball is engaged with the outlet aperture, fluid is not fully blocked from exiting the valve through the outlet.

In another aspect, an exemplary embodiment of the present disclosure may provide a method of delivering fuel from multiple fuel tanks to an engine comprising: connecting a first fuel tank to a first inlet of a valve; connecting a second fuel tank to a second inlet of the valve; directing fuel from the first and second tanks through the first and the second inlets and out of the valve through an elliptical outlet aperture to an associated engine; rotating the valve to engage a ball within the valve with the outlet aperture; and delivering fuel to the engine through at least one gap defined between an edge of the outlet aperture and the ball when the ball is engaged with the outlet aperture.

In another aspect, and exemplary embodiment of the present disclosure may provide a method of providing continuous fluid flow from dual fluid tanks comprising: delivering fluid from a first fluid tank into a valve through a first inlet defined in the valve; delivering fluid from a second fluid tank into the valve through a second inlet defined in the valve; and directing the fluids from the first and second fluid tanks out of the valve through at least one gap defined between an edge of an elliptical outlet aperture and a ball within the valve when the ball is engaged with the outlet aperture.

BRIEF DESCRIPTION OF THE SEVERAL VIEWS OF THE DRAWINGS

Sample embodiments of the present disclosure are set forth in the following description are shown in the drawings and are particularly and distinctly pointed out and set forth in the appended claims.

Similar numbers refer to similar parts throughout the drawings.

DETAILED DESCRIPTION

Figure 1:
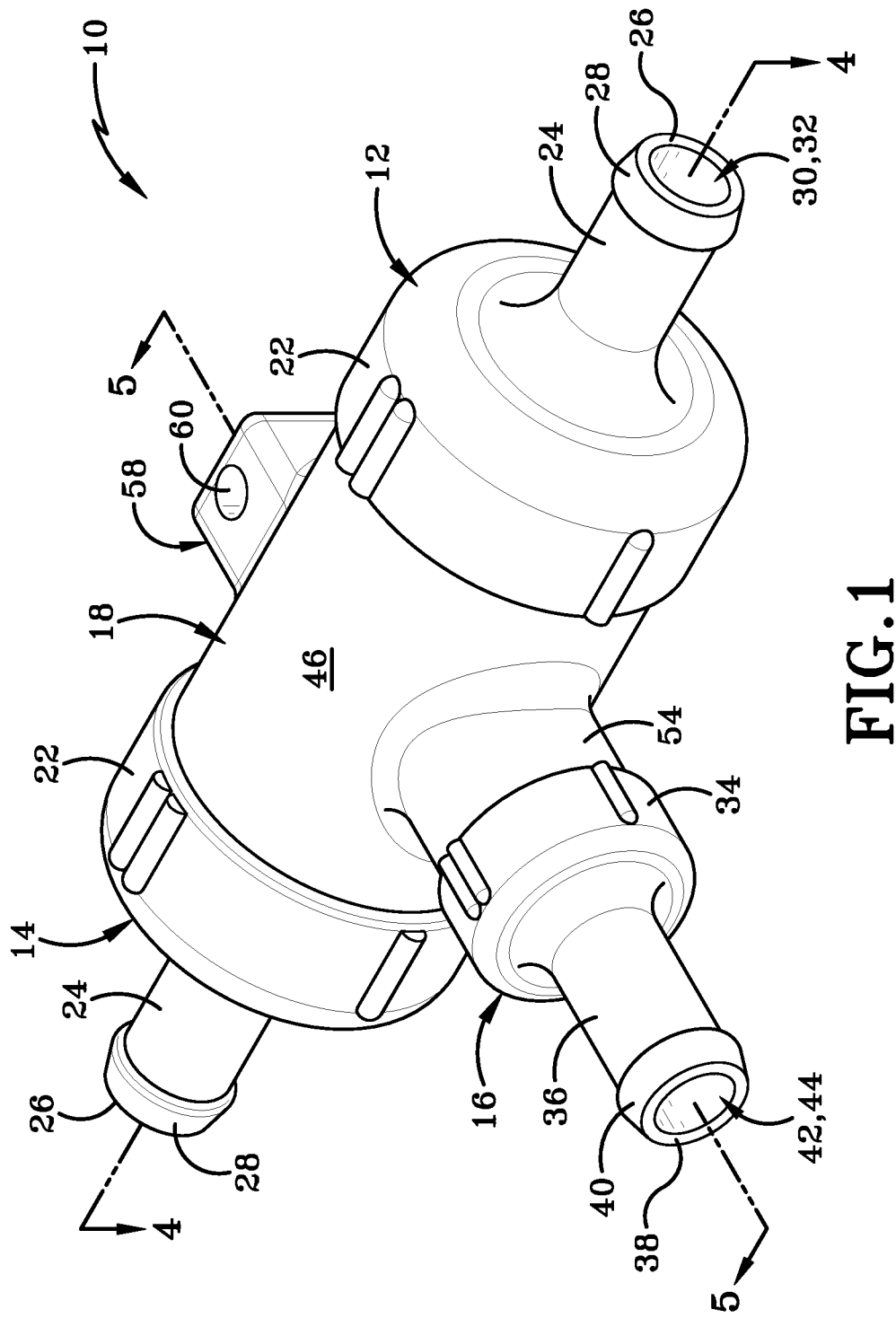
FIG. 1 (FIG. 1) is a top isometric perspective view of a valve according to one aspect of the present disclosure.

With reference to FIGS. 1-5, a dual valve is shown and indicated as valve 10. Valve 10 may be a checking T valve, ball valve, or the like, as described further below, and may include a first inlet adapter 12, a second inlet adapter 14, an outlet adapter 16, and a body 18 with a ball 20 contained therein.

Generally speaking, valve 10 may be formed of any suitable material including plastics/polymers, polymer resins, metal, or any other suitable material for use in forming a valve as described herein. Valve 10, although shown and described having a generally T-shaped configuration, may be any suitable shape for operably connecting multiple fuel tanks to a single engine as discussed further below.

First and second inlet adapters 12 and 14 may be substantially identical but for their position on body 18, as discussed below. Specifically, first inlet adapter 12 may be aligned with a first inlet aperture 50 of body 18 and second inlet adapter 14 may be aligned with second inlet aperture 52, as discussed further below. Otherwise, first and second inlet adapters 12 and 14 may be identical and may further include a base 22 for operable connection to body 18, and a stem 24 having a tip 26 opposite base 22. Stem 24 and tip 26 may extend outwardly from base 22 and may define the operable connection point between valve 10 and fuel lines 68 from fuel tanks 64, as discussed further below. Tip 26 of stem 24 may further include a flared ring flange or simply ring 28, which may be operable to engage fuel line 68 and coupler 70 as discussed herein. First and second inlet adapters 12 and 14 may further include an aperture 30 defined though tip 26 and stem 24, which further define a channel 32 within the interior of inlet adapters 12 and 14. This aperture 30 and channel 32 may be the conduit by which fuel may travel through adapters 12 and 14 and into the chamber 48 of body 18 as discussed below.

Outlet adapter 16 may likewise be similar to first and second inlet adapters 12 and 14 but for its placement on body 18, and/or the size thereof. Specifically, as with first and second inlet adapters 12 and 14, outlet adapter 16 may include a base 34 with a stem 36 extending therefrom and terminating in a tip 38 with a flared ring flange 40 or ring 40. Outlet adapter 16 may further include an aperture 42 defined through tip 38 and stem 38 and in communication with an interior channel 44, which may further define the conduit through which fuel may travel from valve 10 to an associated engine 66, as discussed further herein. Stem 36, tip 38, and flared ring 40 may likewise serve as the operational engagement point to connect outlet adapter 16 to engine 66 via a fuel line 68 and coupler 70, as discussed further herein.

With continued reference to FIGS. 1-5, body 18 may generally have a housing 46, which may define a chamber 48 therein, which may be a hollow interior chamber 48 operable to contain and/or convey a fluid, such as gasoline fuel or the like, through valve 10. Chamber 48 may further include ball 20 therein, which may be a stainless steel or similar material that may be ground to have a seamless surface finish. Chamber 48 and ball 20 may vary in size according to the scale of valve 10; however, it will be understood that chamber 48 may be sized appropriately to allow ball 20 to move freely therein between the first and second inlet apertures 50 and 52 as indicated by Arrows M in FIGS. 4, 8, 10, and 12. Accordingly, the size and dimensions of chamber 48 may be slightly larger than the diameter D of ball 20 to allow the movement of ball 20 within chamber 48, as discussed further below.

Housing 46 of body 18 accordingly may then include a first inlet aperture 50 and a second inlet aperture 52 opposite therefrom and which may further define openings into chamber 48 through which fuel may enter chamber 48 from the channels 32 of inlet adapters 12 and 14, as discussed further below.

Housing 46 of body 18 may further include an outlet stem 54 extending perpendicularly away from chamber 48 and in communication therewith and further defining an outlet aperture 56 therethrough. Outlet aperture 56 may have an edge 55 defining the junction between the aperture 56 and the chamber 48. Edge 55 may further be the portion of aperture 56 with which the ball 20 may engage, as discussed below. As further discussed below with regards to the operation of valve 10, outlet stem 54 and outlet aperture 56 may serve to combine fuel flowing into chamber 48 from fuel tanks 64 through first and second inlet apertures 50 and 52 into a single output flow to an associated engine 66.

Housing 46 of body 18 may further include one or more mounting flanges such as mounting flange 58 having a mounting aperture 60 defined therethrough. Mounting flanges 58 and mounting aperture 60 may allow valve 10 to be securely mounted to a frame or similar structure during the operational use thereof. According to one example where valve 10 is being used on a lawn mower or similar type vehicle, mounting flange 58 and mounting aperture 60 may allow for operational engagement with the frame thereof.

Figure 4:
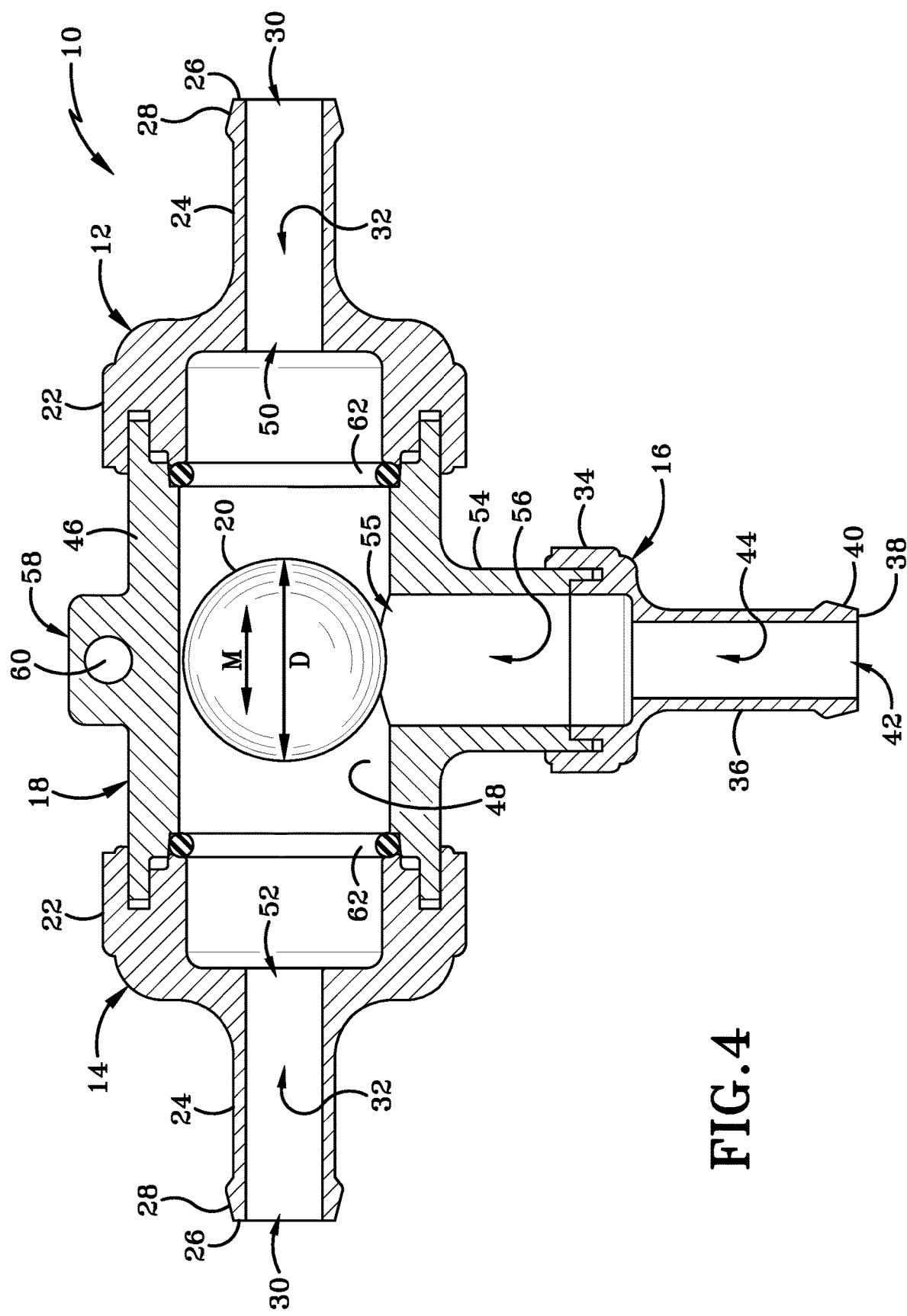
FIG. 4 (FIG. 4) is a cross-sectional view of a valve taken in the direction of the line indicated in FIG. 1 according to one aspect of the present disclosure.
Figure 5:
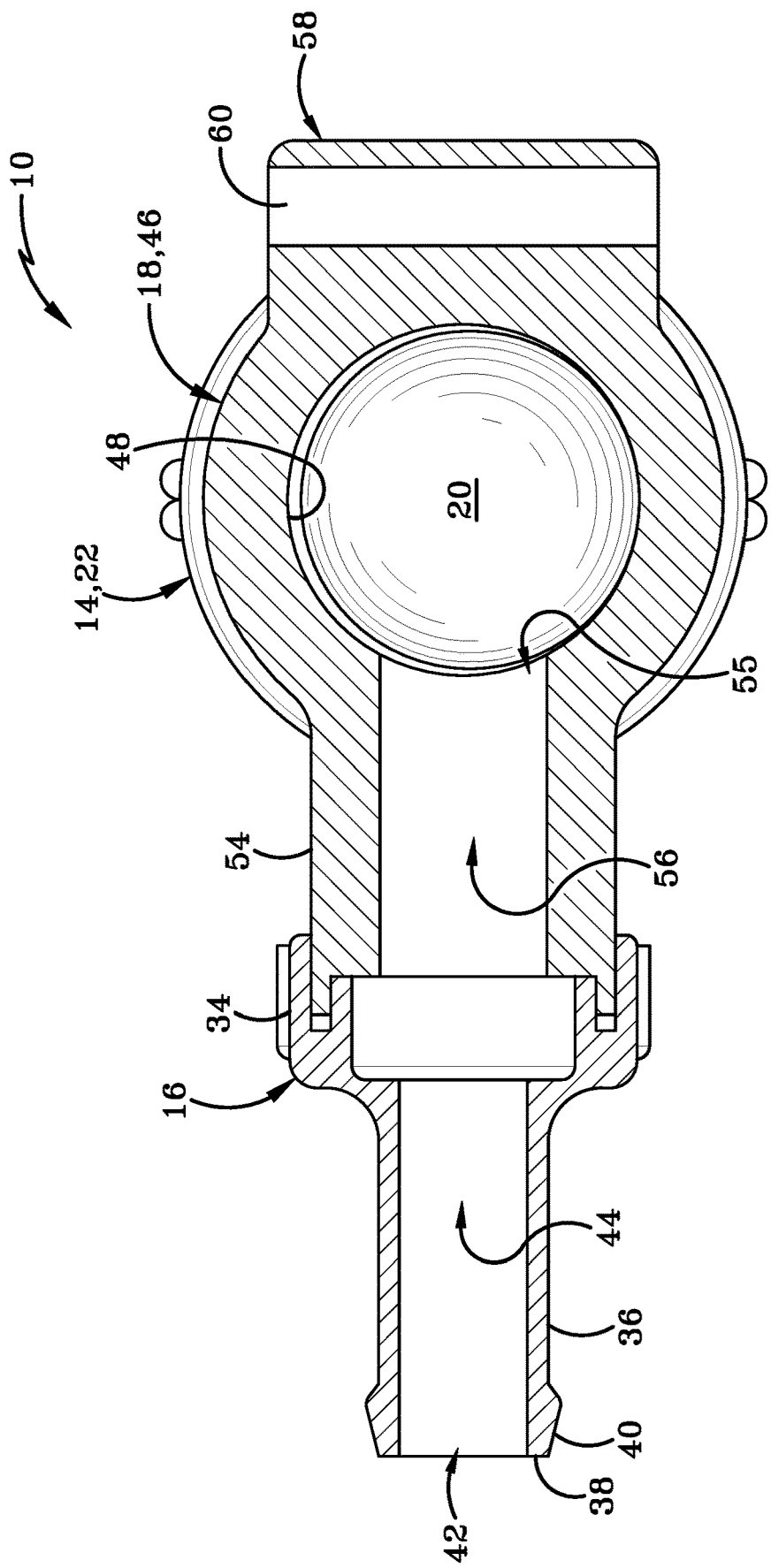
FIG. 5 (FIG. 5) is a cross-sectional view of a valve taken in the direction of the line indicated in FIG. 1 according to one aspect of the present disclosure.

Housing 46 of body 18 may be operably connected to first and second inlet adapters 12 and 14 and outlet adapter 16 such that first inlet adapter 12 may align with first inlet aperture 50, second inlet adapter 14 may align with second inlet aperture 52, and outlet adapter 16 may align with outlet aperture 56 to provide a continuous fluid path between channels 32 and 44 of inlet adapters 12, 14, outlet adapter 16, and chamber 48 defined in housing 46 of body 18. Adapters 12, 14, and 16 may operably connect to body 18 through any suitable means including snap fit, friction fit, threadable engagement, spin welding, or the like, and may include one or more sealing members, shown as O-rings 62, displaced at the junction thereof to create a fluid-tight seal between any of adapters 12, 14, and/or 16 and body 18. According to one aspect, as best seen in FIG. 4, O-rings 62 may be provided at the junction between first and second inlet adapters 12 and 14 and body 18 and omitted from outlet adapter 16 as the inclusion of outlet stem 54 on body 18 may allow for a more complete or tighter seal between outlet adapter 16 and body 18. Alternatively, not shown, additional O-rings 62 may be provided with outlet adapter 16 as desired or dictated by the desired implementation. Although described as O-rings 62, sealing members 62 may be any suitable alternative for sealing the junction between housing 46 and adapters 12, 14, and/or 16.

Figure 2:
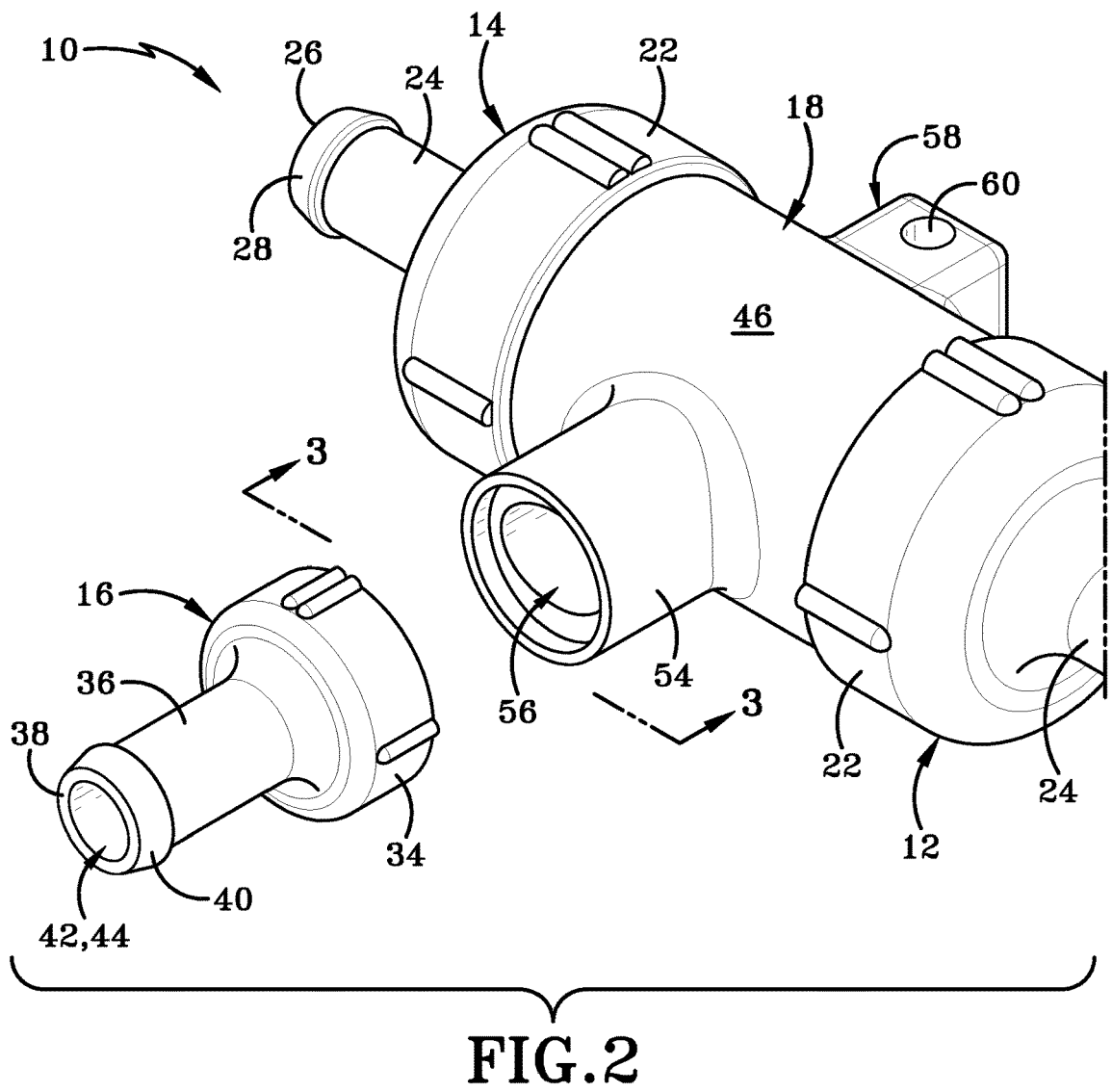
FIG. 2 (FIG. 2) is a top isometric perspective partially-exploded view of a valve according to one aspect of the present disclosure.
Figure 3:
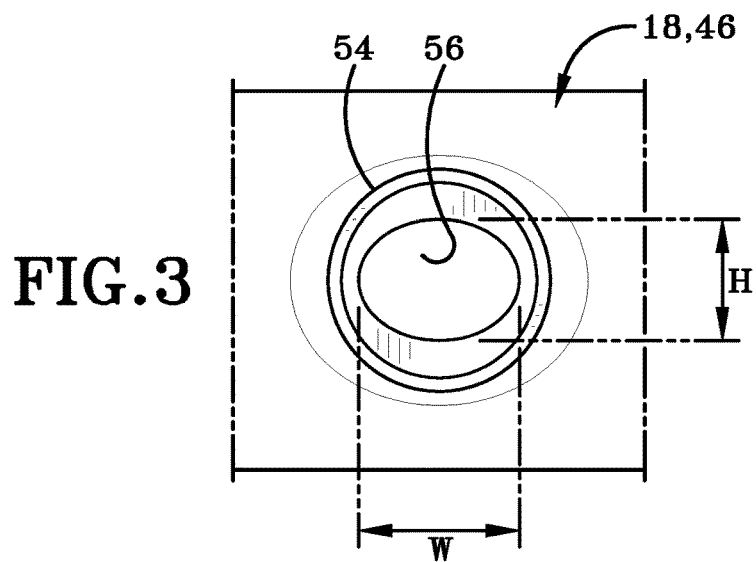
FIG. 3 (FIG. 3) is a view of the outlet of a valve taken in the direction of the line indicated in FIG. 2 according to one aspect of the present disclosure.

With reference to FIGS. 2-4, outlet aperture 56 may extend through the entire width of outlet stem 54 and may generally have an oval or elliptical shape having a width W that is greater than a height H thereof. According to one aspect, outlet aperture 56 width W may be greater than the height H by a ratio of 2:1 or more. According to another aspect, the ration between the width W and height H may be any suitable range provided that a) width W is greater than height H and b) width W is greater than diameter D of ball 20 while height H is less than diameter D of ball 20.

Figure 11:
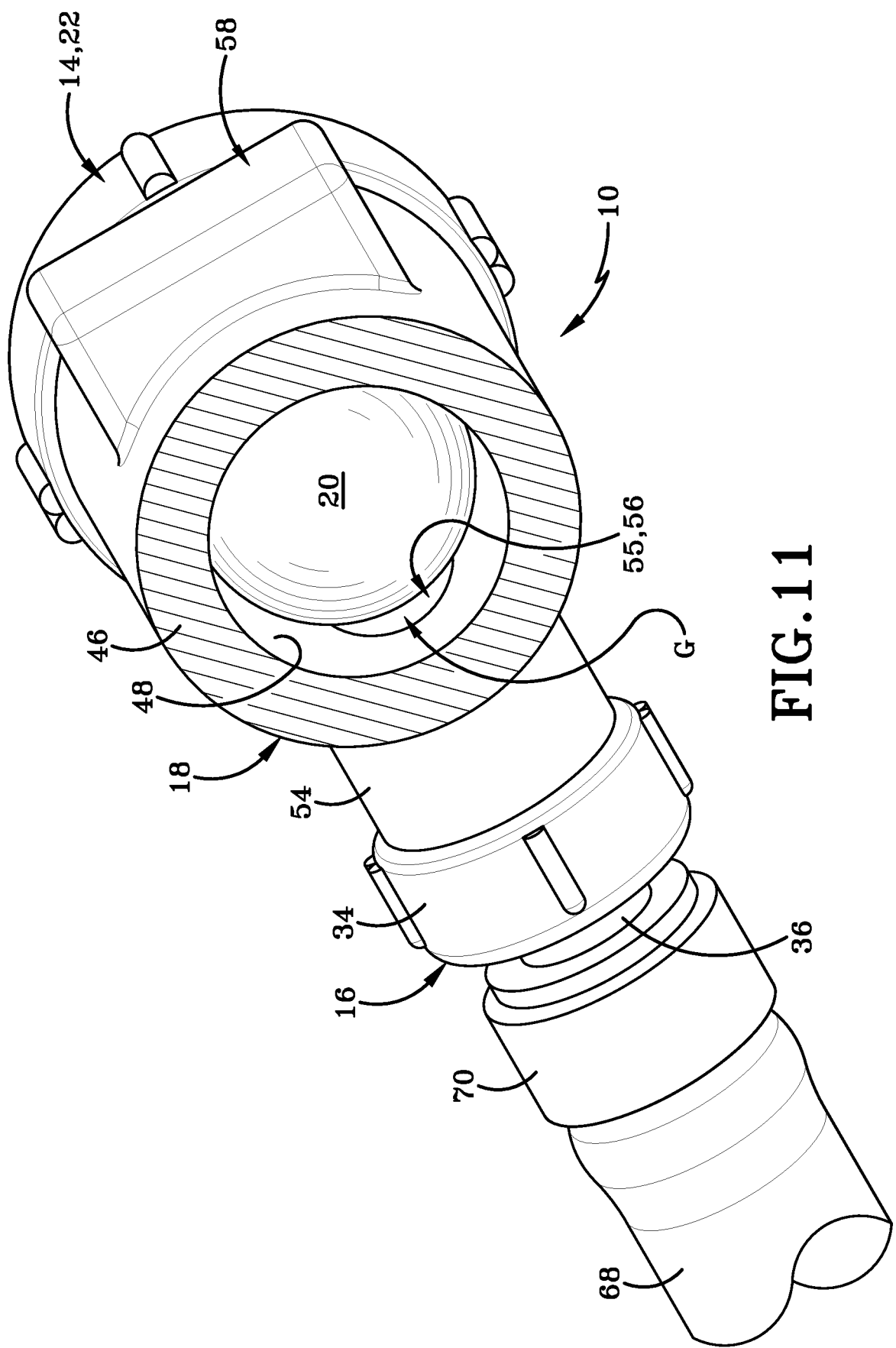
FIG. 11 (FIG. 11) is a cross-section operational view of the valve looking in the direction of the line indicated in FIG. 9.
Figure 12:
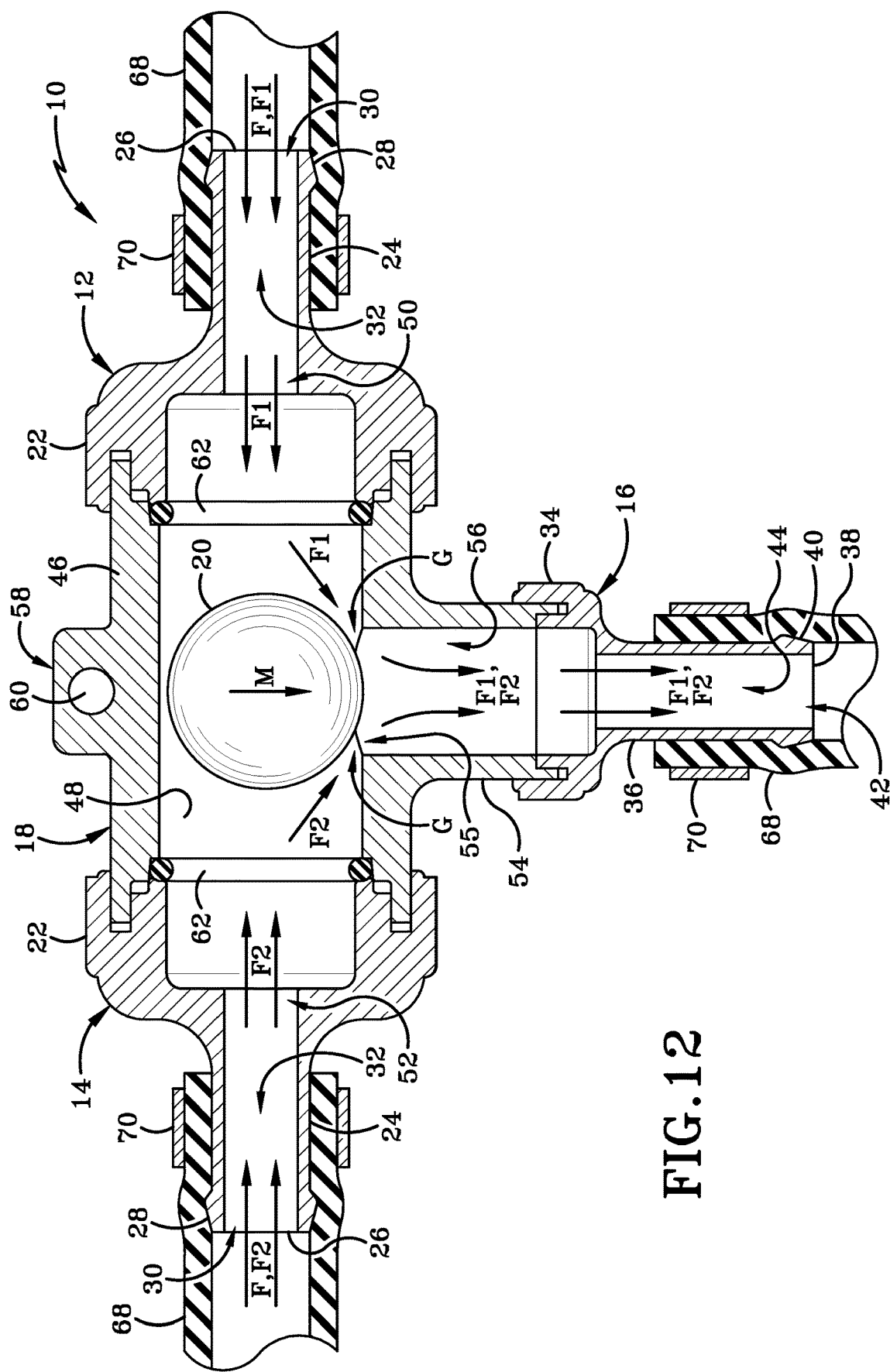
FIG. 12 (FIG. 12) is a cross-section operational view of the valve looking in the direction of the line indicated in FIG. 10.

Outlet aperture 56 may therefore further define gaps G (as seen best in FIGS. 4, 11, and 12) between ball 20 and outlet aperture 56 when ball 20 is centered on outlet stem 54, as discussed further below. With regards to the operation of valve 10, discussed further below, gap G on either side of ball 20 may allow fuel to pass therethrough even when ball 20 is centered on outlet stem 54 such that ball 20 does not fully seal outlet aperture 56 at any point during the use of valve 10.

Figure 6:
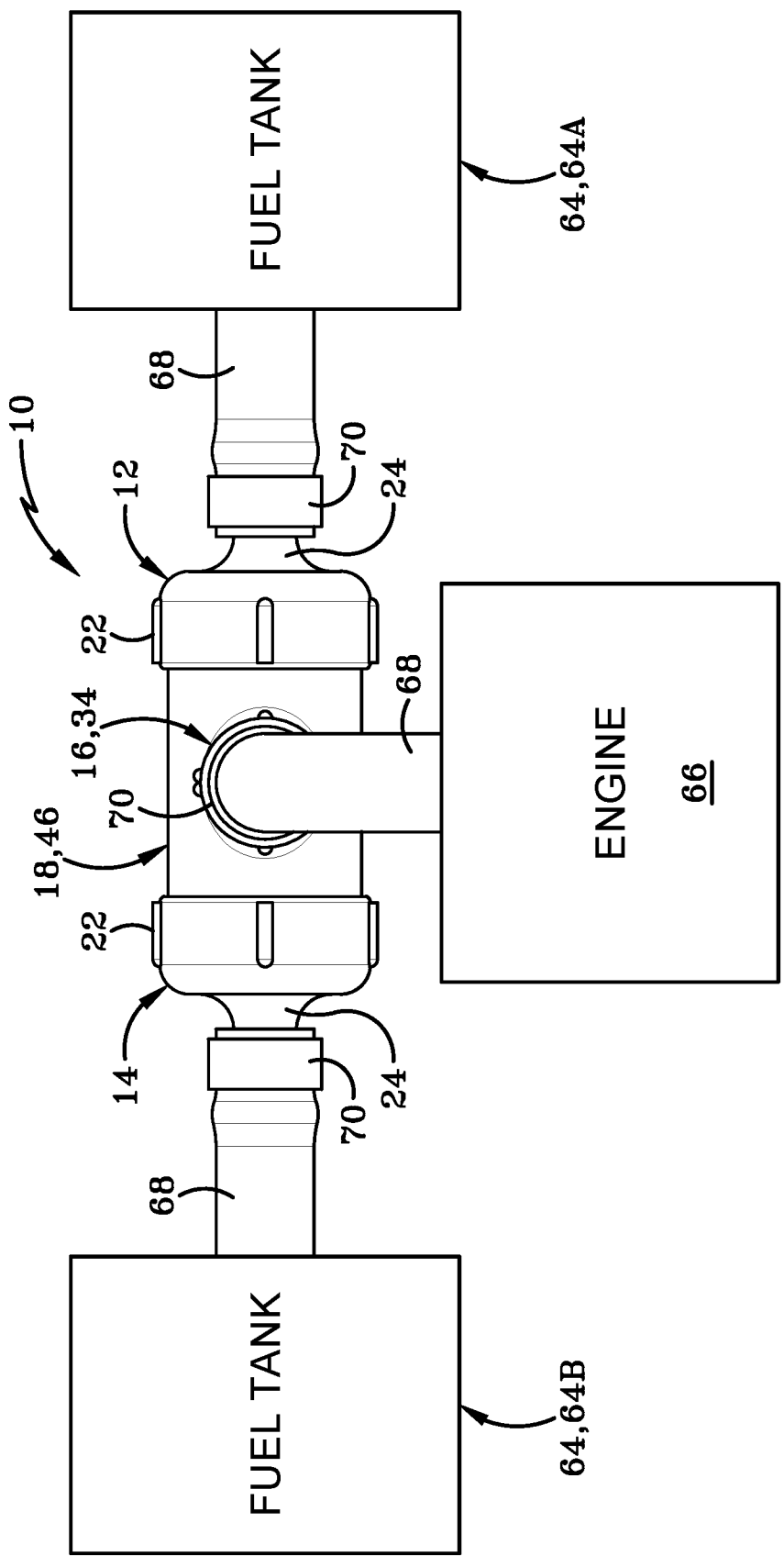
FIG. 6 (FIG. 6) is a front plan elevation operational view of a valve according to one aspect of the present disclosure.

With reference to FIG. 6, a generalized operational view of valve 10 is shown in connection and association with dual fuel tanks 64 and engine 66. Fuel tanks 64 may be dual tanks in that they may be entirely separate from one another and arranged to either side of valve 10 and may further be connected thereto. In particular, fuel tanks 64 may connect to valve 10 via a fuel line 68, which may be a hose or similar conduit, and a coupler 70, which may be a hose clamp or other similar device operable to secure fuel line 68 to stem 24 of inlet adapters 12 and/or 14. Alternatively, fuel tank 64 may be two partitions of a single fuel tank or may be any other suitable dual output fuel tank as dictated by the desired implementation.

Engine 66 may be similarly connected to the outlet adapter 16 of valve 10 via a fuel line 68 and coupler 70 to allow the transfer of fuel from fuel tanks 64, through valve 10, and into engine 66. Engine 66 may be any suitable fuel-fed combustion engine as dictated by the desired implementation. According to one aspect, as used in the examples provided herein, engine 66 may be any suitably sized engine carried by a ride-on lawn mower or similar vehicle, including, but not limited to gasoline, natural gas, propane, flex-fuel, ethanol, diesel, bio-diesel, or hybrid engines.

Having discussed the components and elements of valve 10 and the configuration thereof, the operation and use of valve 10 will now be discussed.

Figure 7:
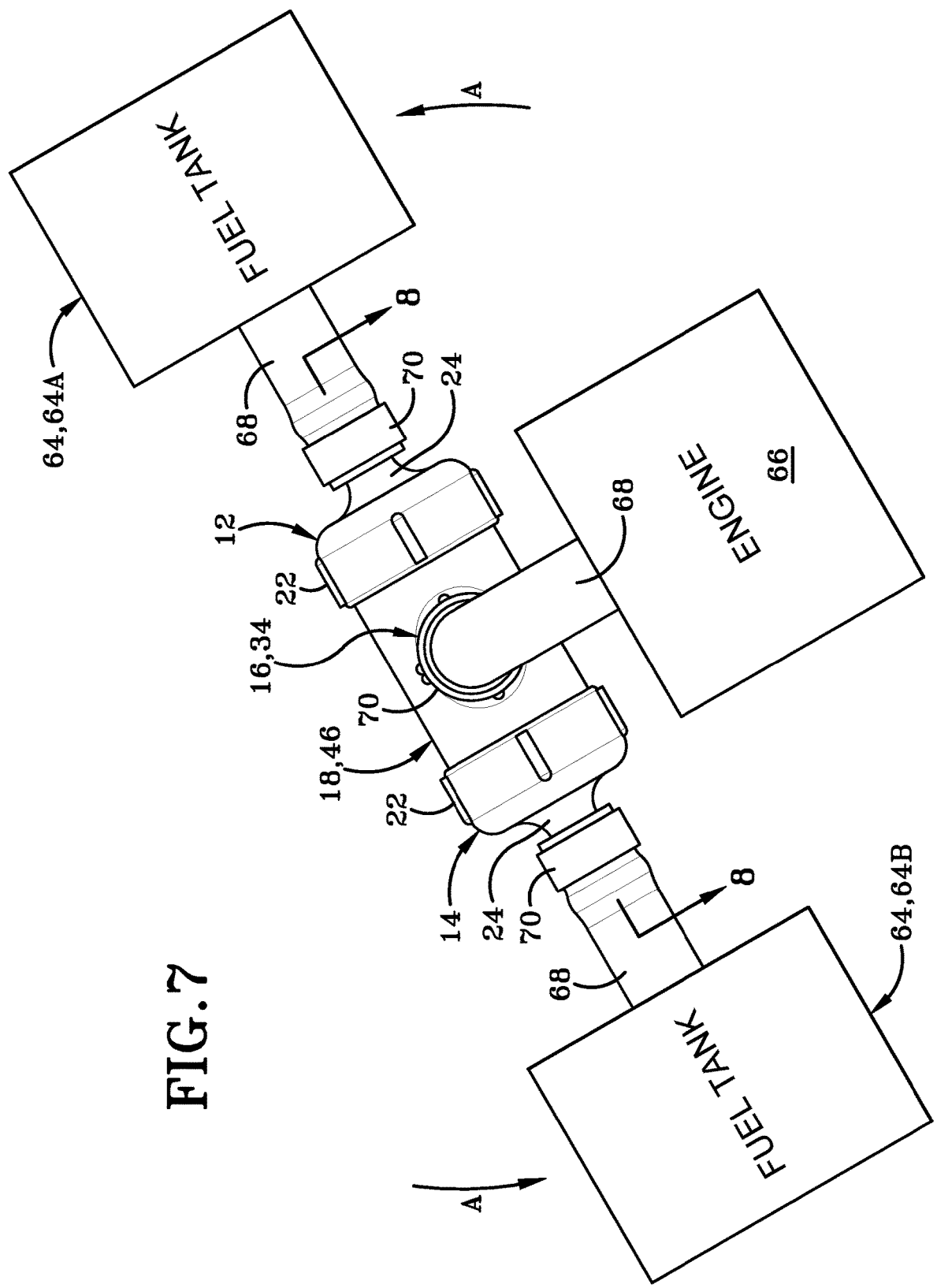
FIG. 7 (FIG. 7) is a front plan elevation operational view of a rotated valve according to one aspect of the present disclosure.
Figure 8:
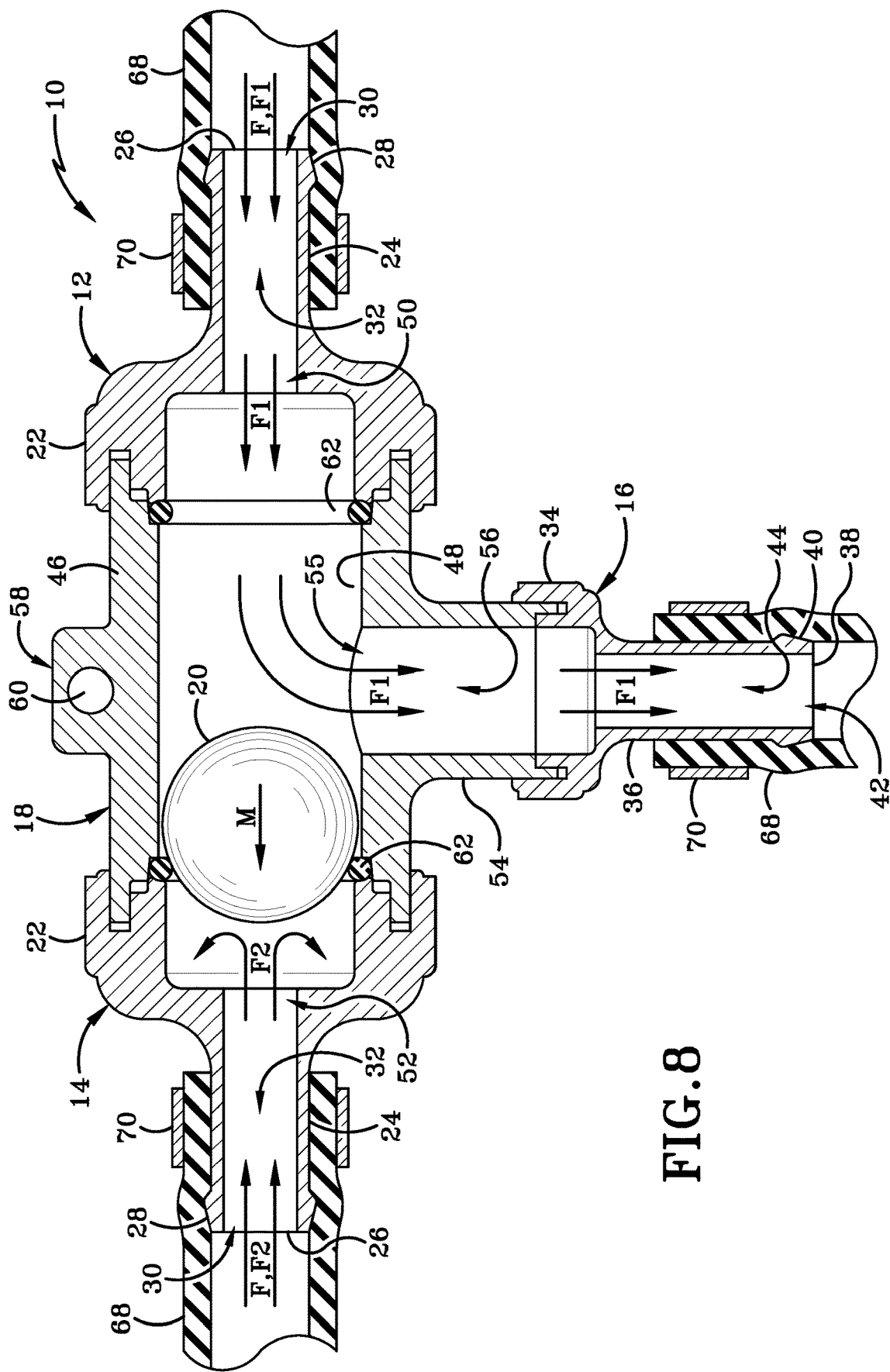
FIG. 8 (FIG. 8) is a cross-section operational view of a valve taken in the direction of the line indicated in FIG. 7 according to one aspect of the present disclosure.

With reference to FIGS. 7 and 8, the use and operation of valve 10 will be described according to an example wherein the valve is installed on a riding lawn mower such as a commercial zero-turn mower utilizing dual fuel tanks to supply a single engine. As described previously herein, valve 10 includes ball 20, which may move freely within chamber 48 of body 18. The purpose of the ball is to allow fuel to flow from fuel tanks 64 through valve 10 and to the engine 66 without allowing fuel transfer between each fuel tank 64. Ball 20 may be further operable to seal off a tank with a lower fuel level, such as when the tank 64 is angled, as discussed further below. This may prevent an excess amount of air from reaching the engine 66 during operation of the mower.

In particular, valve 10 may operate like a standard dual valve with regards to the relationship between the dual fuel tanks 64. In particular, as seen in FIG. 7, when the mower is operated on an incline in a way that causes the fuel tanks 64 and valve 10 to rotate and orient at an angle (indicated by arrows A in FIG. 7), fuel would flow not just through valve 10 and towards engine 66, but fuel would also tend to flow between fuel tanks 64. In particular, the arrows labeled F (in FIG. 8) represent the fuel flowing through the system while the arrows indicated F1 represent fuel coming from a first tank 64A while arrows indicated at F2 represent fuel coming from a second fuel tank 64B. In this instance, where the valve is rotated towards second fuel tank 64B, ball 20 may roll in the direction of Arrow M to engage second inlet adapter 14 on that side of valve 10, thus sealing off the flow from the fuel tank 64B (shown at arrows F2). This is important as this fuel F2 will remain in the fuel tank 64B and/or in the fuel line 68 on that side of valve 10. Further, ball 20 will prevent any air from flowing from the fuel tank 64B and into the engine should the angle at which valve 10 is tilted cause the fuel level in fuel tank 64B to drop below channel 32.

Fuel flowing from the opposite fuel tank 64A (indicated at F1) may flow freely through valve 10 towards engine 66 unobstructed while simultaneously being blocked from entering the second tank 64B by ball 20. This may prevent uneven fuel levels between the two tanks and may further prevent fuel F1 from first tank 64A from being split between the engine 66 and the second tank 64B. This helps ensure that engine 66 has an adequate fuel supply for operation on uneven or sloped terrain.

In the instance that the mower is oriented in the opposite direction (i.e. with first fuel tank 64A oriented downwards, ball 20 may move to the opposite side, thus reversing the process and allowing fuel F2 from the second tank 64B to reach the engine 66 while blocking off first tank 64A on the other side.

Figure 9:
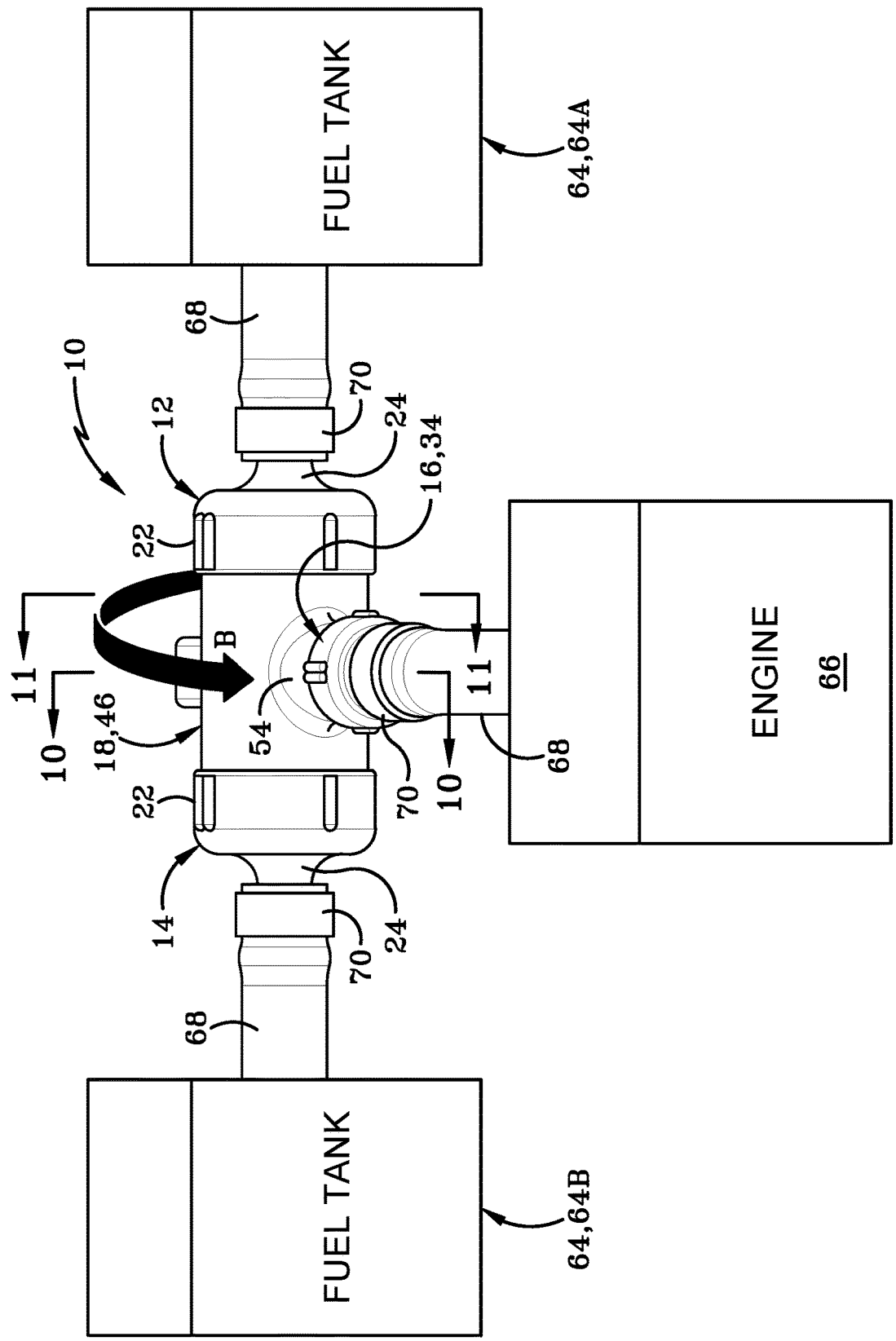
FIG. 9 (FIG. 9) is a front plan elevation operational view of a rotated valve according to one aspect of the present disclosure.
Figure 10:
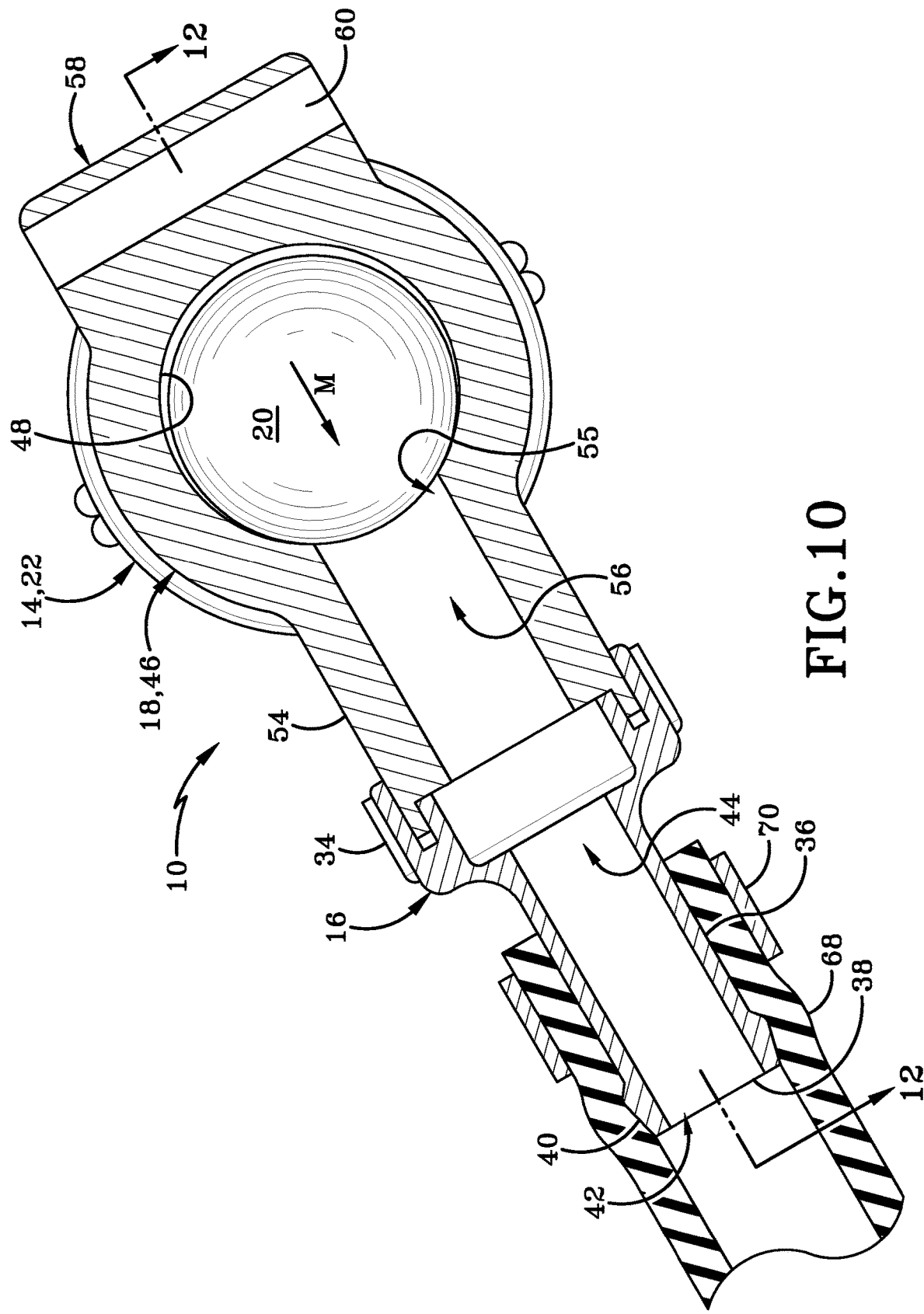
FIG. 10 (FIG. 10) is a cross-section operational view of the valve looking in the direction of the line indicated in FIG. 9.

As mentioned above, to this point in its operation, valve 10 performs similar to current systems in that ball 20 prevents the flow of fuel between tanks 64A and 64B and further prevents an influx of air coming from the lower of the two tanks 64. Valve 10 differs from current solutions when the mower, and subsequently the engine 66, is angled in a manner to orient the valve 10 in a forwardly tilted position, as indicated by Arrow B in FIG. 9.

In current systems, when the valve is oriented with the outlet aperture angled downward, it is common that the ball of that valve would rest in outlet aperture and seal it off, not allowing fuel to flow through the valve to the engine. For very short term periods of operation with a valve in this position, such as going over a small bump or minor obstruction, the fuel within the fuel lines between the valve and the engine is usually sufficient to keep the engine operating until the fuel flow is restored once the valve is reoriented to disengage the ball from the outlet aperture. However, when the valve is oriented in the forward position longer than just momentarily, the ball can settle in the opening of the outlet aperture and disrupt the flow of fuel to choke the engine and cause the engine to stall. In these instances, current systems the engine will remain blocked and starved of fuel until the mower is moved to dislodge the ball from the outlet aperture. This can be time consuming, difficult, and potentially very dangerous as these mowers (or other similar vehicles) can be extremely large and heavy and the physical manipulation thereof (particularly on an incline) can cause serious injury to the operator, damage to the vehicle, and/or damage to the surrounding environment.

With reference then to FIGS. 9-12, the present valve 10 differs from current solutions in that vale 10 is operable to allow fuel to be delivered to the engine 66 at all times, including in instances where the valve 10 is angled downward for extended periods of time, such as when a mower is operated on a downward incline. In particular, the elliptical shape of outlet aperture 56 prevents ball 20 from settling in the opening thereof and blocking the flow of fuel to the engine. The elliptical shape of aperture 56 allows fuel to flow from the tanks 64 through gaps G between the edge 55 of the aperture 56 and the ball 20. Even in extreme instances, if the fuel flow through gaps G is somewhat restricted by ball 20, the restriction is not sufficient to choke the engine 66 or to cause it to stall, as with current systems. Alternatively, should the engine stall. Rather than move the vehicle manually to dislodge ball 20 from aperture 56, gaps G may allow fuel to refill fuel line 68 between the valve 10 and engine 66 to provide enough fuel to restart engine 66, allowing operation of the vehicle to resume.

Accordingly, the present valve 10 may allow for safer and more continuous operation of a vehicle utilizing the dual fuel tanks without unwanted stalling or otherwise interrupting the operation thereof even when operated on uneven or not level terrain.

Although described herein with relation a commercial zero-turn mower or similar implement, it will be understood that valve 10 may be scaled for use in any suitable vehicle or similar implement utilizing dual fuel tanks to feed a single engine or similar device. It will therefore be understood that valve 10 may be readily adapted for uses other than the exemplary use with a lawn mower described herein.

It will be further understood that valve 10 may be readily adapted for use with other fluids to combine a first fluid flow and a second fluid flow into a single outlet flow. According to one example, valve 10 may be readily adapted for use with water tanks. According to other examples, valve 10 may be readily adapted for use with oil systems, hydraulic systems, or any other suitable system where it is desirable to combine multiple fluid flows into a single output flow that is not interrupted by ball 20 engaging the outlet aperture 56, as described herein.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A valve comprising:
   a first inlet connected to a first fluid tank;
   a second inlet connected to a second fluid tank;
   an outlet having an elliptical aperture defined therein, the aperture having a width and a height, wherein the width of the aperture is greater than the height of the aperture; and
   a ball moveable between a first position wherein the ball is engaged with the first inlet, a second position wherein the ball is engaged with the second inlet, and a third position wherein the ball is engaged with the outlet aperture;
   wherein when the ball is engaged with the first inlet in the first position, fluid is blocked from entering the valve through the first inlet, when the ball is engaged with the second inlet in the second position, fluid is blocked from entering the valve through the second inlet, and wherein when the ball is engaged with the outlet aperture in the third position, fluid is not fully blocked from exiting the valve through the outlet.

2. The valve of claim 1 wherein the first fluid tank and the second fluid tank further comprise:
   a first fuel tank; and
   a second fuel tank.

3. The valve of claim 2 further comprising:
   a first inlet adapter connecting the first inlet to the first fuel tank;
   a second inlet adapter connecting the second inlet to the second fuel tank; and
   an outlet adapter connecting the outlet to an associated engine to deliver fuel from the first and second fuel tanks to the engine.

4. The valve of claim 1 wherein the width of the outlet aperture is greater than a diameter of the ball and the height of the outlet aperture is smaller than the diameter of the ball.

5. The valve of claim 4 wherein the ratio between the width of the outlet aperture and the height of the outlet aperture is 2:1.

6. The valve of claim 4 wherein the ratio between the width of the outlet aperture and the height of the outlet aperture is greater than 2:1.

7. The valve of claim 1 wherein the outlet aperture further defines at least one gap between an edge of the aperture and the ball when the ball is engaged with the outlet aperture.

8. The valve of claim 7 wherein the at least one gap is operable to allow fluid to pass out of an interior chamber in the valve through the outlet aperture.

9. A method of delivering fuel from multiple fuel tanks to an engine comprising:
   connecting a first fuel tank to a first inlet of a valve;
   connecting a second fuel tank to a second inlet of the valve;
   directing fuel from the first and second tanks through the first and the second inlets and out of the valve through an elliptical outlet aperture to an associated engine;
   rotating the valve to engage a ball within the valve with the outlet aperture; and
   delivering fuel to the engine through at least one gap defined between an edge of the outlet aperture and the ball when the ball is engaged with the outlet aperture.

10. The method of claim 9 wherein the outlet aperture further comprises:
    a height; and
    a width that is greater than the height;
    wherein the width is greater than a diameter of the ball and the height is smaller than the diameter of the ball.

11. The method of claim 10 wherein the ratio between the width of the outlet aperture and the height of the outlet aperture is 2:1.

12. The method of claim 10 wherein the ratio between the width of the outlet aperture and the height of the outlet aperture is greater than 2:1.

13. The method of claim 10 further comprising:
    rotating the valve to a first position wherein the first fuel tank is positioned below the second fuel tank;
    engaging the ball with the first inlet;
    preventing fuel from entering the first fuel tank via the ball; and
    preventing air from entering the valve from the first fuel tank via the ball.

14. The method of claim 13 further comprising:
    delivering fuel to the engine through the outlet aperture from the second fuel tank.

15. The method of claim 13 further comprising:
    rotating the valve to a second position wherein the second fuel tank is positioned below the first fuel tank;
    disengaging the ball from the first inlet;
    engaging the ball with the second inlet;
    preventing fuel from entering the second fuel tank via the ball; and
    preventing air from entering the valve from the second fuel tank via the ball.

16. The method of claim 15 further comprising:
    delivering fuel to the engine through the outlet aperture from the first fuel tank.

17. A method of providing continuous fluid flow from dual fluid tanks comprising:
    delivering fluid from a first fluid tank into a valve through a first inlet defined in the valve;
    delivering fluid from a second fluid tank into the valve through a second inlet defined in the valve; and
    directing the fluids from the first and second fluid tanks out of the valve through at least one gap defined between an edge of an elliptical outlet aperture and a ball within the valve when the ball is engaged with the outlet aperture.

18. The method of claim 17 wherein the outlet aperture further comprises:
    a height; and
    a width that is greater than the height;

wherein the width is greater than a diameter of the ball and the height is smaller than the diameter of the ball.

19. The method of claim 18 wherein the ratio between the width of the outlet aperture and the height of the outlet aperture is 2:1.

20. The method of claim 18 wherein the ratio between the width of the outlet aperture and the height of the outlet aperture is greater than 2:1.

\* \* \* \* \*